(12) United States Patent
Chiu et al.

(10) Patent No.: US 12,345,910 B2
(45) Date of Patent: Jul. 1, 2025

(54) LIGHT GUIDE PLATE AND BACKLIGHT MODULE

(71) Applicant: Darwin Precisions Corporation, Hsinchu County (TW)

(72) Inventors: Yu-Huan Chiu, Hsinchu County (TW); Chien-Wei Liao, Hsinchu County (TW); Yen-Lung Chen, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 56 days.

(21) Appl. No.: 18/196,167

(22) Filed: May 11, 2023

(65) Prior Publication Data
US 2023/0384504 A1    Nov. 30, 2023

(30) Foreign Application Priority Data
May 30, 2022    (TW) .................................. 111120107

(51) Int. Cl.
*F21V 8/00*    (2006.01)

(52) U.S. Cl.
CPC ......... *G02B 6/0036* (2013.01); *G02B 6/0058* (2013.01); *G02B 6/0038* (2013.01)

(58) Field of Classification Search
CPC .. G02B 6/0036; G02B 6/0045; G02B 6/0046; G02B 6/0038; G02B 6/0043;
(Continued)

(56) References Cited

U.S. PATENT DOCUMENTS

| 5,896,119 A | * | 4/1999 | Evanicky | ............... | G06F 1/1616 |
| | | | | | 345/905 |
| 6,991,359 B2 | * | 1/2006 | Leu | ....................... | G02B 6/0061 |
| | | | | | 362/348 |

(Continued)

FOREIGN PATENT DOCUMENTS

| CN | 101413641 A | 4/2009 |
| CN | 106940459 A | 7/2017 |

(Continued)

OTHER PUBLICATIONS

TIPO has issued the Office Action for the corresponding Taiwan application on Aug. 23, 2023.
(Continued)

*Primary Examiner* — Jong-Suk (James) Lee
*Assistant Examiner* — James M Endo
(74) *Attorney, Agent, or Firm* — WPAT, PC

(57) ABSTRACT

A backlight module includes a light guide plate and a light source module. The light guide plate includes a light receiving surface, a light exit surface, and a bottom surface. The light exit surface is connected to a first end of the light receiving surface. The bottom surface is connected to a second end of the light receiving surface opposite to the first end and located opposite to the light exit surface. The bottom surface includes a central region and a peripheral girdle region at least partially surrounding the central region. The central region includes a plurality of first reflecting structures, and the peripheral girdle region includes a plurality of second reflecting structures. The second reflecting structure is different from the first reflecting structure. The light source module is disposed along the light receiving surface and provides light beams incident into the light receiving surface.

11 Claims, 10 Drawing Sheets

(58) Field of Classification Search
CPC .... G02B 6/004; G02B 6/0058; G02B 6/0061; G02B 6/0035
See application file for complete search history.

(56) References Cited

U.S. PATENT DOCUMENTS

| | | | | |
|---|---|---|---|---|
| 10,823,898 | B1* | 11/2020 | Xie | G02B 6/0043 |
| 2002/0030650 | A1* | 3/2002 | Kawada | G02B 6/0036 |
| | | | | 345/87 |
| 2004/0184257 | A1* | 9/2004 | Huang | G02B 6/0043 |
| | | | | 362/613 |
| 2005/0190579 | A1* | 9/2005 | Lin | G02B 6/004 |
| | | | | 362/618 |
| 2008/0278659 | A1 | 11/2008 | Park | |
| 2015/0168631 | A1* | 6/2015 | Umekawa | G02B 6/0073 |
| | | | | 362/613 |
| 2016/0131820 | A1* | 5/2016 | Lin | G02B 6/0041 |
| | | | | 362/606 |
| 2017/0192166 | A1 | 7/2017 | Hsieh | |
| 2018/0045384 | A1* | 2/2018 | Uno | G02B 6/0043 |
| 2018/0284338 | A1* | 10/2018 | Wang | G02B 6/0058 |
| 2018/0321555 | A1* | 11/2018 | Hata | G02B 6/0055 |
| 2020/0183229 | A1 | 6/2020 | Chang et al. | |

FOREIGN PATENT DOCUMENTS

| | | |
|---|---|---|
| CN | 109491006 A | 3/2019 |
| CN | 209606651 U | 11/2019 |
| TW | 200819864 A | 5/2008 |
| TW | 201809833 A | 3/2018 |
| TW | 201910680 A | 3/2019 |

OTHER PUBLICATIONS

CNIPA has issued the Office Action for the corresponding China application on Feb. 29, 2024.

* cited by examiner

LIGHT GUIDE PLATE AND BACKLIGHT MODULE

BACKGROUND

Cross-Reference to Related Application

This application claims the priority benefit of Taiwan application serial no. 111120107 filed on May 30, 2022. The entirety of the above-mentioned patent application is hereby incorporated by reference herein and made a part of this specification.

TECHNICAL FIELD

The instant disclosure generally relates to a light guide plate and a backlight module. Particularly, the instant disclosure relates to a light guide plate and a backlight module having different structures in a bottom surface.

RELATED ART

At present, display technologies have widely used in various electronic apparatus for displaying the desired information and video. In the display technologies, liquid crystal display (LCD) is the most widely used product. The LCD generally includes a liquid crystal display panel and a backlight module. The backlight module mainly provides light beams with high luminance and high uniformity to the liquid crystal display panel. The liquid crystal display panel controls the gray level and the color of light beams passing through each pixel to display the desired image.

The backlight module is generally divided into an edge type backlight module and a direct type backlight module. The edge type backlight module mainly includes a light source module and a light guide plate. The light source module is disposed adjacent to a light receiving surface at one side of the light guide plate. Light beams are uniformly guided to a light exit surface of a top portion of the light guide plate by reflecting light beams from a bottom surface of a bottom portion, and projected to the liquid crystal display panel.

In the edge type backlight module, reflecting structures are currently configured on the bottom surface of the bottom portion to control the reflecting direction of light beams. One type of the reflecting structures is a plurality of micro-reflecting structures arranged in an array. The micro-reflecting structures can effectively reflect the light beams to the light exit surface. However, the array-arranged micro-reflecting structures usually has a problem of intensive concentration of light beams at the peripheral region of the bottom surface, so that problem of bright line or spray light will correspondingly occur at the peripheral region of the light exit surface, resulting in the non-uniform display at the peripheral region of the LCD, and thus affecting the display quality and the user's experience. Therefore, how to improve the bright line and the spray light at the peripheral region is an issue to be resolved for a person skilled in the art.

SUMMARY

An object of the instant disclosure is directed to a light guide plate and a backlight module. A peripheral girdle region is configured to surround a central region at a bottom surface of the light guide plate. Reflecting structures at the peripheral girdle region and the central region are different, so that the problem of intensive concentration of light beams at the peripheral region can be reduced, and the problems of the bright line and the spray light at the light exit surface corresponding to the peripheral region can be improved.

An embodiment of the instant disclosure is directed to a light guide plate. The light guide plate includes a light receiving surface, a light exit surface, and a bottom surface. The light exit surface is connected to a first end of the light receiving surface. The bottom surface is connected to a second end of the light receiving surface opposite to the first end and located opposite to the light exit surface. The bottom surface includes a central region and a peripheral girdle region. The peripheral girdle region at least partially surrounds the central region. The central region includes a plurality of first reflecting structures, and the peripheral girdle region includes a plurality of second reflecting structures. The second reflecting structure is different from the first reflecting structure.

An embodiment of the instant disclosure is directed to a backlight module including a light guide plate and a light source module. The light guide plate is a light guide plate described in the aforementioned embodiment. The light source module is distributed along the light receiving surface and provides light beams incident into the light receiving surface.

Another embodiment of the instant disclosure is directed to a light guide plate. The light guide plate includes a light receiving surface, a light exit surface and a first side surface. The light exit surface is connected to a first end of the light receiving surface. The bottom surface is connected to the light receiving surface and a second end opposite to the first end and located opposite to the light exit surface. The first side surface is located between the light exit surface and the bottom surface. The first side surface is connected to the light receiving surface, the light exit surface and the bottom surface. The bottom surface has a central region, a first side edge and a first peripheral substructure. The central region is located in the center of the bottom surface. The first side edge is located at a location where the bottom surface and the first side surface are connected. The first peripheral substructure is located between the first side edge and the central region. The central region has a plurality of first reflecting structures. The first peripheral substructure has a plurality of second reflecting structures different from the first reflecting structures.

The light guide plate and the backlight module of the instant disclosure include the peripheral girdle region different from the central region at the bottom surface, so that the light beams at the peripheral girdle region can be uniformly reflected to the light exit surface, and the problem of intensive concentration of light beams at the peripheral girdle region of the bottom surface can be reduced. Therefore, the problem of bright line and spray light at the light exit surface corresponding to the peripheral girdle region can be relatively resolved.

DETAILED DESCRIPTION

Figure 1:
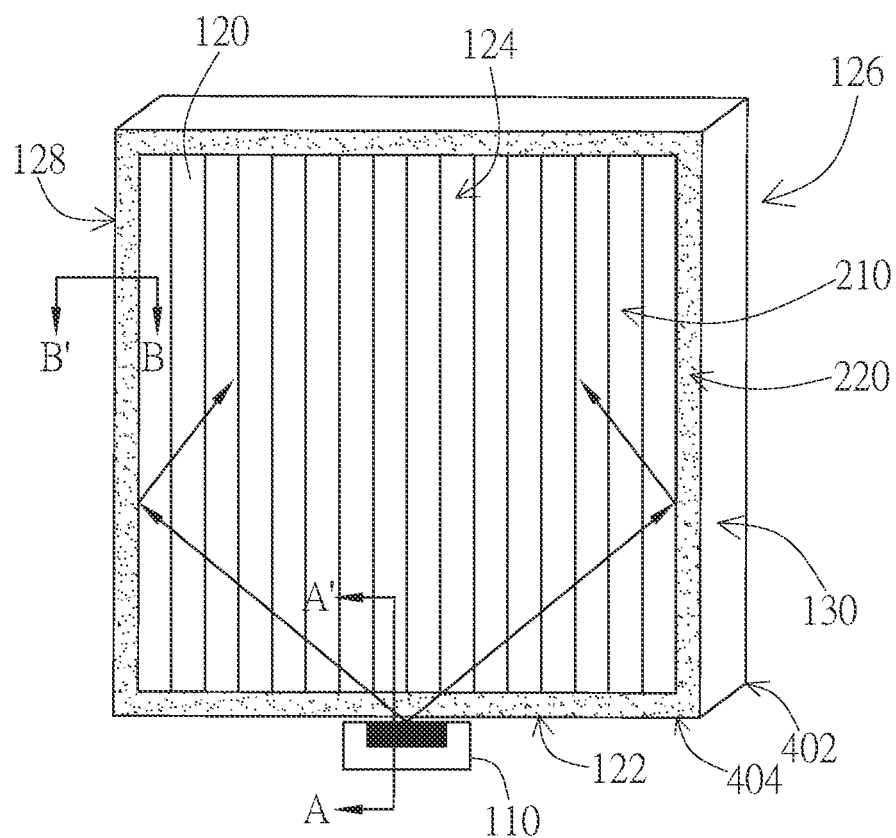
FIG. 1 is a schematic view showing the bottom surface of the light guide plate in an embodiment of the instant disclosure.

FIG. 1 is a schematic view showing the bottom surface of the light guide plate in an embodiment of the instant disclosure. As shown in FIG. 1, a backlight module 100 includes a light source module 110 and a light guide plate 120. The backlight module 100 may be an edge type backlight module. The light source module 110 is disposed adjacent to the light guide plate 120 to provide light beams to the light guide plate 120. The light source module 110, for example, may be a light-emitting diode (LED), a laser diode (LD), etc., which can have a smaller volume, but not limited thereto. One or more light source modules 110 may be disposed in parallel, but not limited thereto. The light source module 110 may be a light tube, which is well known by a person skilled in the art and will not be described in detail herein.

The light guide plate 120 includes a light receiving surface 122, a bottom surface 124 and a light exit surface 126. The light source module 110 is distributed along the light receiving surface 122 and provides light beams incident into the light receiving surface 122. The light receiving surface 122 is disposed adjacent to the light source module 110 and configured to receive the light beams emitted from the light source module 110. The light receiving surface 122 has a first end 402 and a second end 404 disposed in opposite. The bottom surface 124 is connected to the second end 404 of the light receiving surface 122, which is opposite to the first end 402. The bottom surface 124 is disposed opposite to the light exit surface 126 and configured to reflect light beams entering from the light receiving surface 122 to the light exit surface 126. The light exit surface 126 is connected to the first end 402 of the light receiving surface 122 and configured to output the light beams emitted from the light source module 110, including the light beams reflected via the bottom surface 124. The light beams emitted by the light source module 110 are projected into the interior of the light guide plate 120 from the light receiving surface 122, in which a part of the light beams is refracted to the light exit surface 126, and another part of the light beams is reflected to the light exit surface 126 through the total reflection from the bottom surface 124. Hence, most of the light beams projected from the light source module 110 into the light receiving surface 122 may be guided to the light exit surface 126 at the top portion and outputted therefrom. The light guide plate 120 further includes a first side surface 128 and a second side surface 130 respectively disposed at two sides of the light guide plate 120. The first side surface 128 and the second side surface 130 each connects the light receiving surface 122, the bottom surface 124 and the light exit surface 126.

Figure 2A:
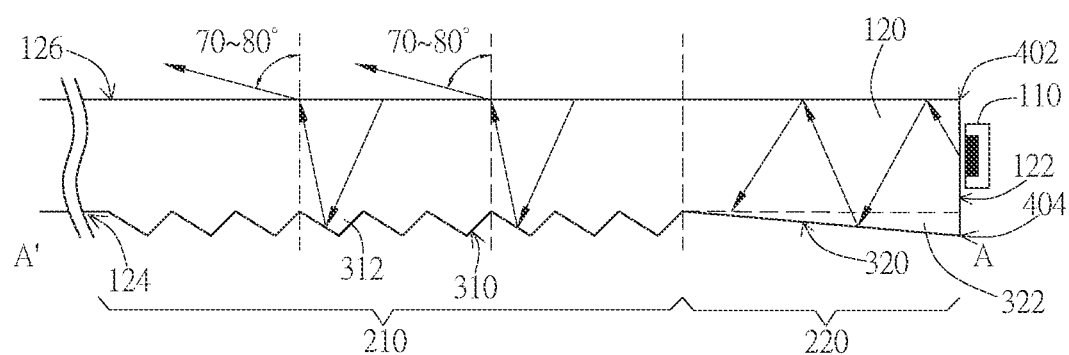
FIG. 2A is a schematic cross-sectional view along a cross-section line A-A' in the light guide plate of FIG. 1 with the light exit surface positioned upward.
Figure 2B:
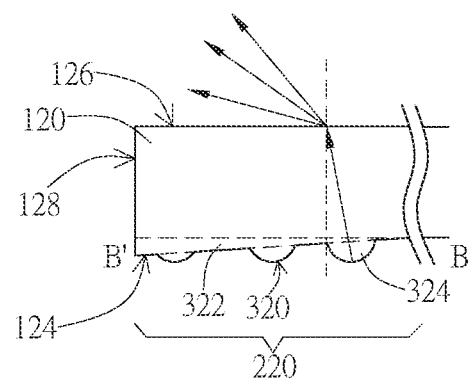
FIG. 2B is a schematic cross-sectional view along a cross-section line B-B' in the light guide plate of FIG. 1 with the light exit surface positioned upward.
Figure 3:
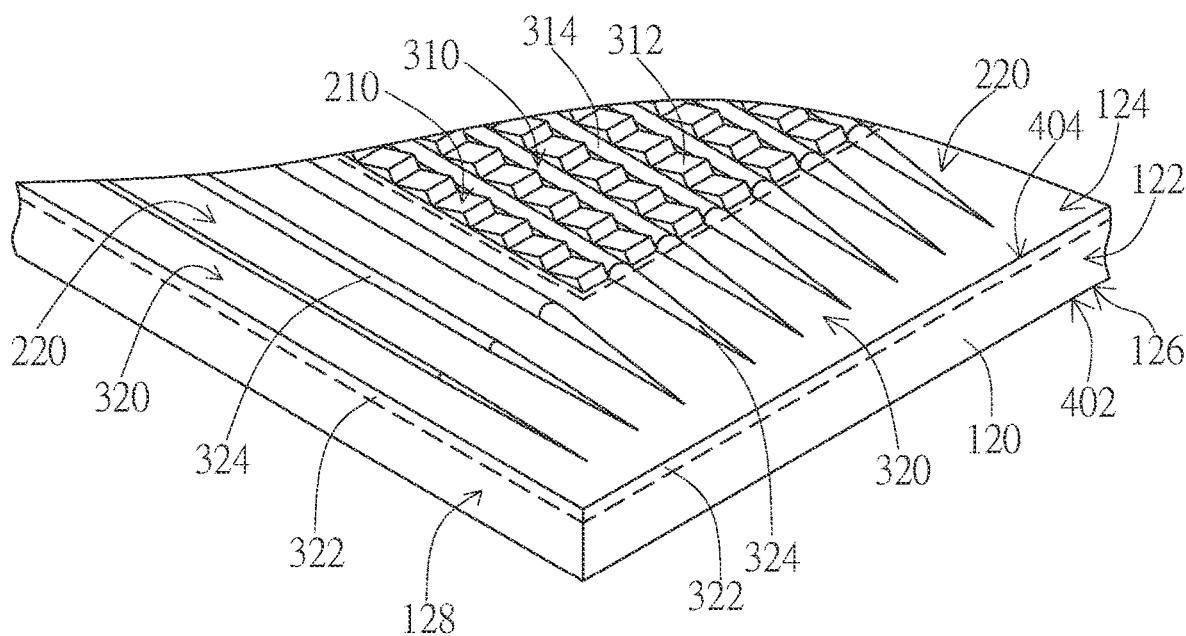
FIG. 3 is a partially enlarged schematic diagram showing the lower left corner of the bottom surface of the light guide plate in an embodiment of the instant disclosure.

FIG. 2A is a schematic cross-sectional view along a cross-sectional line A-A' in the light guide plate of FIG. 1 with the light exit surface 126 positioned upward. FIG. 2B is schematic cross-sectional view along a cross-sectional line B-B' in the light guide plate of FIG. 1 with the light exit surface 126 positioned upward. FIG. 3 is a partially enlarged schematic diagram showing the lower left corner of the bottom surface of the light guide plate in an embodiment of the instant disclosure. The bottom surface 124 includes a central region 210 and a peripheral girdle region 220, and the peripheral girdle region 220 at least partially surrounds the central region 210. The central region 210 has a plurality of first reflecting structures 310. The peripheral girdle region 220 has a plurality of second reflecting structures 320 different from the first reflecting structures 310. By utilizing the structure design that the second reflecting structure 320 is different from the first reflecting structure 310, the second reflecting structure 320 may obtain a larger angle range of reflection and various light beam orientations in different directions. Therefore, the reflected light beams at the peripheral girdle region can be uniformly dispersed, thus reducing the concentration of light at the corresponding light exit surface 126, so as to greatly reduce the bright line or spray light at the light exit surface 126 corresponding to the peripheral girdle region 220.

Please refer to FIG. 1 to FIG. 3. The first reflecting structures 310 in the central region 210 may include a micro-reflection structure design of a plurality of tilted V-cut nodes 312 arranged in array, but not limited thereto. The tilted V-cut nodes 312 take a short edge design at one side adjacent to the light source module 110 and a long edge design at another side away from the light source module 110 to improve the effect of total reflection. The structure of the tilted V-cut node 312 is similar to a triangular prism and may be considered as an integrated structure extending outward from the light guide plate 120. In one embodiment, the tilted V-cut nodes 312 are configured along an extended direction of light beams of the light source module 110. For example, the node length may be designed as 10 micrometers (μm)-100 μm, and the node length may be preferably 55 μm-65 μm, but not limited thereto. As shown in FIG. 2A, the light beams projected into the light guide plate 120 are reflected by the tilted V-cut node 312, and then refracted through the light exit surface 126. The light beams exiting from the light exit surface 126 have an included angle of about 70°-80° with a normal direction of the light exit surface 126, so that the light beams exiting from the light exit surface 126 corresponding to the central region 210 have a high uniformity.

In a modified embodiment, in addition to the tilted V-cut nodes 312 of the first reflecting structure 310 in the central region 210, the central region 210 can further include a plurality of first strip prisms 314. The first strip prisms 314 are alternately disposed between the first reflecting structures 310, and respectively extend substantially perpendicular to the light receiving surface 122. The average height of the first strip prisms 314 may be larger than the average height of the first reflecting structures 310. This is well known for a person skilled in the art, and it will not be described in detail herein.

Please refer to FIG. 1 to FIG. 3. The second reflecting structures 320 adopt a reflecting structure design or a micro reflecting structure design that is different from the first reflecting structures 310, to improve the distribution uniformity of light, which is reflected to the light exit surface 126 from the peripheral girdle region 220.

Please refer to FIG. 1 to FIG. 3. The second reflecting structure 320 includes an inclined structure 322, which is configured to uniformly distribute the light beams around the peripheral girdle region 220. As shown FIG. 2A, FIG. 2B and FIG. 3, the cross section of the inclined structure 322 along the cross-sectional line A-A' and cross-sectional line B-B' may have a shape of an inclined triangle. Taking the inclined triangle structure as an example for the inclined structure 322, the light beams emitted from the light source module 110 and projected into the light receiving surface 122 are reflected and guided by the inclined structure 322, so that the light beams emitted from the light exit surface 126 are uniformly reflected from the peripheral girdle region 220, and thus the problem of spray light can be reduced. In addition, by utilizing the design of the inclined structure 322, the light beams of the peripheral girdle region 220 adjacent to the first side surface 128 and the second side surface 130 can be guided to improve the uniformity of light distribution, preventing the light from intensively concentrating at the region near the first side surface 128 and the second side surface 130, and thus mitigating the problem of bright line.

Figure 4A:
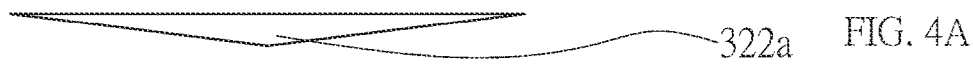
FIGS. 4A-4J are schematic diagrams of inclined structures in various shapes, which can be included in the second reflecting structure of the peripheral girdle region in other embodiments of the instant disclosure.
Figure 4B:
Figure 4C:
Figure 4D:
Figure 4E:
Figure 4F:
Figure 4G:
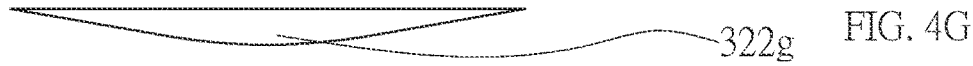
Figure 4H:
Figure 4I:
Figure 4J:

FIGS. 4A-4J are schematic diagrams of inclined structures 322 in various shapes, which can be included in the second reflecting structure 320 of the peripheral girdle region 220 in other embodiments of the instant disclosure. Please refer to FIG. 1 to FIG. 3. The inclined structure 322 between the central region 210 and the first side surface 128 is used as an example. As shown in FIG. 2B and FIG. 3, the cross section of the second reflecting structure 320 along the cross-sectional line B-B' may have a shape of an inclined triangle. In a modified embodiment, the inclined structure 322 may have various structure designs, and its cross-sectional shape may be designed in other shapes. Referring to FIG. 4A, a cross-sectional shape of the inclined structure 322 may be a regular V shape 322a. Referring to FIG. 4B, a cross-sectional shape of the inclined structure 322 may be a shallow curved shape 322b. Referring to FIG. 4C, a cross-sectional shape of the inclined structure 322 may be a curved shape 322c. Referring to FIG. 4D, a cross-sectional shape of the inclined structure 322 may be a half-curved shape 322d. Referring to FIG. 4E, a cross-sectional shape of the inclined structure 322 may be a rectangle shape 322e. Referring to FIG. 4F, a cross-sectional shape of the inclined structure 322 may be a trapezoidal shape 322f. Referring to FIG. 4G, a cross-sectional shape of the inclined structure 322 may be a V plus R shape 322g. Referring to FIG. 4H, a cross-sectional shape of the inclined structure 322 may be a half-triangle shape 322h. Referring to FIG. 4I, a cross-sectional shape of the inclined structure 322 may be a half-trapezoidal shape 322i. Referring to FIG. 4J, a cross-sectional shape of the inclined structure 322 may be a half-V plus half-R shape 322j. Therefore, a cross-sectional shape of the inclined structure 322 includes at least one of a regular V shape 322a, a shallow curved shape 322b, a curved shape 322c, a half-curved shape 322d, a rectangle shape 322e, a trapezoidal shape 322f, a V plus R shape 322g, a half-triangle shape 322h, a half-trapezoidal shape 322i, a half-V plus half-R shape 322j, but not limited thereto. In addition to the above protruding inclined design, which is adopted for the inclined structure 322 of the second reflecting structure 320, a recessing inclined design or a mixed design of protrusion and recess may be adopted, but not limited thereto.

Please refer to FIG. 1 to FIG. 3. The second reflecting structure 320 further includes a surface structure 324 configured on the inclined structure 322. A strip of half cylinder prism may be used as an example for the surface structure 324. The half cylinder prism may be designed as a prism in a half cylinder shape. As shown in FIG. 3, by utilizing the surface structure 324 with the design of half cylinder prism, the uniformity of reflected light from the peripheral girdle region 220 may be further increased, and the problem of edge bright line or spray light caused by over concentrated light can be prevented.

As shown in FIG. 1, the light beams incident into the light guide plate 120 near the peripheral girdle region 220 of the light guide plate 120 are reflected by the first side surface 128, the second side surface 130 and the second reflecting structure 320 of the peripheral girdle region 220. A part of the light beams is reflected back to the central region 210 to reduce the light beams concentrated near the first side surface 128 and the second surface 130, so that the problem of bright line on the light exit surface 126 near the first side surface 128 and the second side surface 130 can be prevented.

Furthermore, in one embodiment of the instant disclosure, as shown in FIG. 3, the first reflecting structure 310 having the structure design of a plurality of tilted V-cut nodes 312 arranged in array and the second reflecting structure 320 having a strip of half-cylinder prism are used as an example. The second reflecting structure 320 has a length in an extended direction along an adjacent side edge of the bottom surface 124 larger than that of the first reflecting surface 310. The second reflecting structure 320 has a light dispersion efficiency in an extended direction vertical to an adjacent side edge of the bottom surface 124 stronger than that of the first reflecting structure 310. When the light beams travels along the direction vertical to the side edge to the second reflecting structure 320, a larger proportion of the light beams will be directed to other directions by the second reflecting structure 320, and thereby the problem of spray light can be mitigated.

As shown in FIG. 2B, the light beams projected into the light guide plate 120 near the peripheral girdle region 220 of the light guide plate 120 are reflected by the surface structure 324 with the half cylinder prism, and then further refracted through the light exit surface 126, so that the light beams exiting therefrom may have a larger angle distribution. For example, the exiting light beams may have an included angle of about 40°-75° with the normal line of the light exit surface 126, so that the light beams exiting from the light exit surface 126 corresponding to the peripheral girdle region 220 have a high uniformity. By utilizing the surface structure 324 of the second reflecting structure 320, the light beams in the neighborhood of the peripheral girdle region 220 may be refracted to have a larger range of refraction angle and more light scattering. The problem of bright line and spray light due to concentration of light at the region of the light exit surface 126 corresponding to the peripheral girdle region 220 may be prevented.

In addition to the design of half cylinder prism as shown in FIG. 3, the surface structure 324 of the second reflecting structure 320 of the instant disclosure may adopt other designs. In addition to the design of strip prism 314, the surface structure 324 may be designed as micro-dots. In a modified embodiment, a semicircle node for the surface structure 324 is used as an example. The semicircle node may be designed as a half cylinder prism or a hemispheric prism approximately to a dot. In addition to a protruding design for the surface structure 324, a recess design may be adopted. The semicircle node may be designed as a semi-cylindric groove, or the semi-circle node may be designed as a hemispheric cavity.

Figure 5A:
FIGS. 5A-5J are schematic diagrams of surface structures in various shapes, which can be included in the second reflecting structure in various other embodiments of the instant disclosure.
Figure 5B:
Figure 5C:
Figure 5D:
Figure 5E:
Figure 5F:
Figure 5G:
Figure 5H:
Figure 5I:
Figure 5J:

FIGS. 5A-5J are schematic diagrams of surface structures in various shapes, which can be included in the second reflecting structure in other embodiments of the instant disclosure. Please refer to FIG. 1 to FIG. 3. A portion of the second reflecting structure 320 between the central region 210 and the first side surface 128 is used as an example. As shown in FIG. 2B and FIG. 3, the cross-sectional shape of the surface structure 324 along the cross-sectional line B-B' is a semicircle shape. Referring to FIG. 5A, a cross-sectional shape of the surface structure 324 may be a regular V shape 324a. Referring to FIG. 5B, a cross-sectional shape of the surface structure 324 may be a semicircle shape 324b. Referring to FIG. 5C, a cross-sectional shape of the surface structure 324 may be a curved shape 324c. Referring to FIG. 5D, a cross-sectional shape of the surface structure 324 may be a half-curved shape 324d. Referring to FIG. 5E, a cross-sectional shape of the surface structure 324 may be a rectangle shape 324e. Referring to FIG. 5F, a cross-sectional shape of the surface structure 324 may be a trapezoidal shape 324f. Referring to FIG. 5G, a cross-sectional shape of the surface structure 324 may be a V plus R shape 324g. Referring to FIG. 5H, a cross-sectional shape of the surface structure 324 may be a half-triangle shape 324h. Referring to FIG. 5I, a cross-sectional shape of the surface structure 324 may be a half-trapezoidal shape 324i. Referring to FIG. 5J, a cross-sectional shape of the surface structure 324 may be a half-V plus half-R shape 324j. Hence, a cross-sectional shape of the surface structure 324 includes at least one of a regular V shape 324a, a semicircle shape 324b, a curved shape 324c, a half-curved shape 324d, a rectangle shape 324e, a trapezoidal shape 324f, a V plus R shape 324g, a half-triangle shape 324h, a half-trapezoidal shape 324i or a half-V plus half-R shape 324j, but not limited thereto. When the surface structure 324 is designed as a strip or a node, a length or a width of the strip or node like surface structure 324 may be, for example, 10 μm-100 μm, but not limited thereto. The same strip or node like structure described above or a mixed arrangement with different strip or node like structures may be adopted for the surface structure 324. The surface structure 324 may be arranged in random or in array. In addition to the above strip or node like design, the surface structure 324 may adopt other different shapes. A flat design may be adopted for a part of the peripheral girdle region 220. A flat design may also be adopted for a part of the second reflecting structure 320. The space between the strips or the nodes may be increased to increase the design flexibility. In addition to the above protruding prism design, the surface structure 324 of the second reflecting structure 320 may adopt a recess groove or cavity design or a mixed design with protrusion and recess, but not limited thereto.

In addition to the above single-sided light input design for the backlight module 100 of the instant disclosure, a dual-sided light input design may be adopted. For example, another light source module (not shown) can be disposed at another side of the light guide plate 120 (such as opposite to the light source module 110) to achieve the effect of inputting light beams from two sides of the light guide plate. Furthermore, the disposing direction of the first reflecting structure 310 may be modified corresponding to the light source modules based on the dual-sided light input design. This is well known by a person skilled in the art, and it will not be described in detail herein.

In the instant disclosure, similar to the structure design at the bottom surface 124 corresponding to the peripheral girdle region 220, an auxiliary refraction structure may be provided at the light exit surface 126 corresponding to the peripheral girdle region 220, so as to further improve the light distribution uniformity. The refraction structure is similar to the above second reflecting structure 320 and may be referred to the previously mentioned second reflecting structure 320 for details, which is not elaborated herein.

Figure 6:
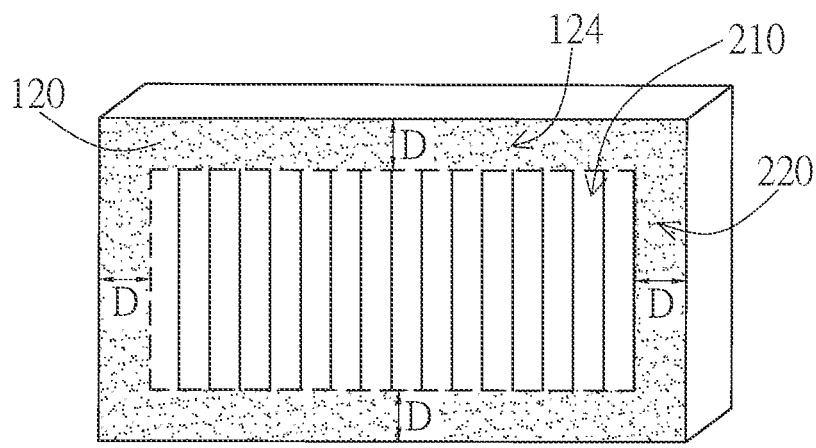
FIG. 6 is a schematic view showing the peripheral girdle region of the bottom surface of the light guide plate having a certain width in an embodiment of the instant disclosure.

FIG. 6 is a schematic view showing the bottom surface of the light guide plate 120 in an embodiment of the instant disclosure, wherein the peripheral girdle region 220 has a width D. The widths D at four sides of the peripheral girdle region 220 of the bottom surface 124 may be designed with the same width, or may be designed with different widths. The width D of the peripheral girdle region 220 may be in a range between 0% and 10% of the width or length of the light guide plate 120, and the width may be adjusted according to the product requirement. The width D of the peripheral girdle region 220 may be equal to or less than 10 millimeters (mm), such as between 0 mm and 10 mm, but not limited thereto.

Figure 7:
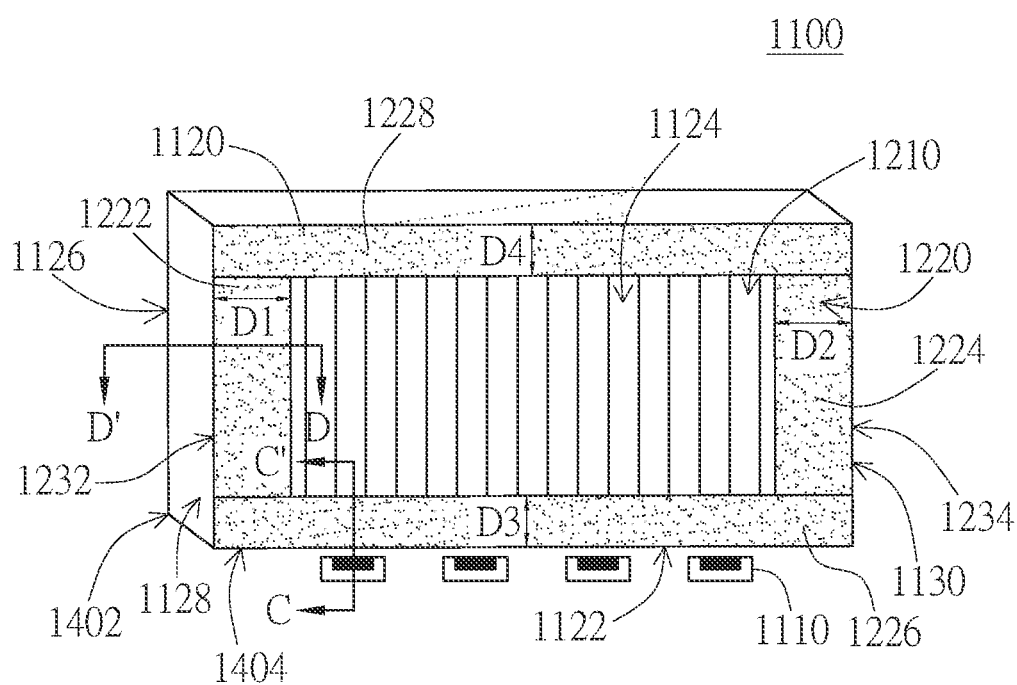
FIG. 7 is a schematic view showing the bottom surface of the light guide plate in another embodiment of the instant disclosure.

The instant disclosure provides another embodiment, which is similar to and can be referred to the aforementioned embodiment, but not limited thereto. Please refer to FIG. 7, and FIG. 7 is a schematic view showing the bottom surface of the light guide plate in another embodiment of the instant disclosure. As shown in FIG. 7, the backlight module 1100 includes a light source module 1110 and a light guide plate 1120. The backlight module 1100 is an edge type backlight module. The light source module 1110 is disposed adjacent to the light guide plate 1120 to provide light beams to the light guide plate 1120. For example, the light source module 1110 may be a light emitting diode (LED) or a laser diode (LD), etc., to have a smaller volume, but not limited thereto. In the embodiment, the light source module 1110 may be a plurality of LEDs arranged in side by side to face the light guide plate 1120, but not limited thereto. The light source module 1110 may be a light tube.

The light guide plate 1120 includes a light receiving surface 1122, a bottom surface 1124 and a light exit surface 1126. The light source module 1110 is distributed along the light receiving surface 1122 and provides light beams into the light receiving surface 1122. The light receiving surface 1122 is disposed adjacent to the light source module 1110 and configured to receive the light beams emitted from the light source module 1110. The light receiving surface 1122 has a first end 1402 and a second end 1404 disposed in opposite. The bottom surface 1124 is connected to the second end 1404 which is opposite to the first end 1402 and configured to reflect light beams entering from the light receiving surface 1122 to the light exit surface 1126. The light exit surface 1126 is connected to the first end 1402 of the light receiving surface 1122 and configured to output the light beams emitted from the light source module 1110, including the light beams reflected via the bottom surface 1124. The light beams emitted by the light source module 1110 are projected into the interior of the light guide plate 1120 from the light receiving surface 1122, in which a part of the light beams is refracted to the light exit surface 1126, and another part of the light beams is reflected to the light exit surface 1126 through total reflection from the bottom surface 1124. Hence, most of the light beams projected from the light source module 1110 into the light receiving surface 1122 may be guided to the light exit surface 1126 at top portion and outputted therefrom. The light guide plate 1120 further includes a first side surface 1128 at one side of the light guide plate 1120. The first side surface 1128 is located between the light exit surface 1126 and the bottom surface 1124 and connects the light receiving surface 1122, light exit surface 1126 and the bottom surface 1124.

Figure 8A:
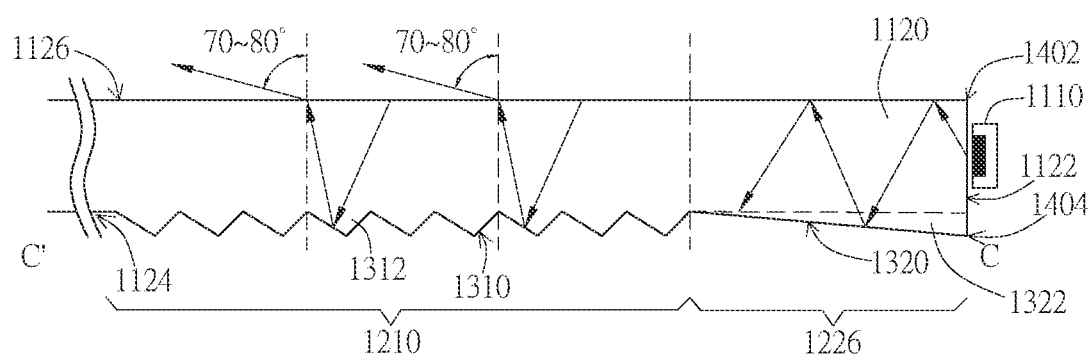
FIG. 8A is a schematic cross-sectional view along a cross-section line C-C' in the light guide plate of FIG. 7 with the light exit surface positioned upward.
Figure 8B:
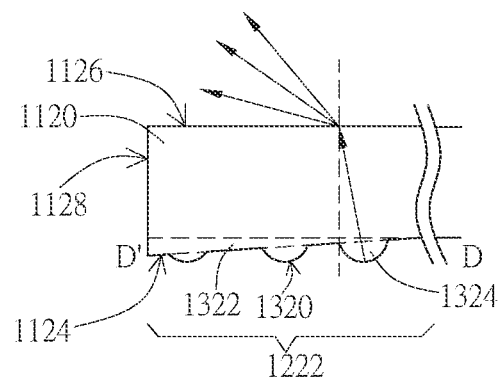
FIG. 8B is a schematic cross-sectional view along a cross-section line D-D' in the light guide plate of FIG. 7 with the light exit surface positioned upward.

FIG. 8A is a schematic cross-sectional view along a cross-sectional line C-C' in the light guide plate of FIG. 7 with the light exit surface positioned upward. FIG. 8B is a schematic cross-sectional view along a cross-sectional line D-D' in the light guide plate of FIG. 7 with the light exit surface positioned upward. The bottom surface 1124 includes a central region 1210, a first peripheral substructure 1222 and a first side edge 1232. The central region 1210 is located at the center of the bottom surface 1124. The first side edge 1232 is located at a location where the bottom surface 1124 and the first side surface 1128 are connected. The first peripheral substructure 1222 is located between the first side edge 1232 and the central region 1210. The central region 1210 has a plurality of first reflecting structures 1310. The first peripheral substructure 1222 has a plurality of second reflecting structures 1320 different from the first reflecting structures 1310.

Please refer to FIG. 7 and FIG. 8A, and also refer to FIG. 3. The first reflecting structures 1310 may include a micro-reflection structure design of a plurality of tilted V-cut nodes 1312 arranged in array, but not limited thereto. The tilted V-cut nodes 1312 take a short edge design at one side adjacent to the light source module 1110 and a long edge design at another side away from the light source module 1110 to improve the effect of total reflection. The structure of the tilted V-cut node 1312 is similar to a triangular prism and may be considered as an integrated structure extending from the light guide plate 1120. In one embodiment, the tilted V-cut nodes 1312 are configured along an extended direction of light beams from the light source module 1110, i.e., an extended direction along the first side edge 1232. For example, the node length may be designed as 10 µm-100 µm, and the node length is preferably 55 µm-65 µm, but not limited thereto. As shown in FIG. 8A, the light beams projected into the light guide plate 1120 are reflected by the tilted V-cut node 1312, and then refracted through the light exit surface 1126. The light beams exiting from the light exit surface 1126 have an included angle of about 70°-80° with a normal direction of the light exit surface 1126, so that the light beams exiting from the light exit surface 1126 corresponding to the central region 1210 have a high uniformity. Please refer to the corresponding part of the aforementioned embodiment for details, which will not be elaborated herein.

Referring to FIG. 7 and FIG. 8B, a micro reflecting structure design different from the first reflecting structures 1310 are adopted for the second reflecting structures 1320 to improve the distribution uniformity of light reflected to the light exit surface 1126 from the first peripheral substructure 1222. The second reflecting structure 1320 includes an inclined structure 1322, which is configured to uniformly distribute the light beams in the area of the first peripheral substructure 1222. As shown in FIG. 7 and FIG. 8B, the cross-sectional shape of the inclined structure 1322 along the cross-sectional line D-D' may be an inclined triangle. A triangular inclined structure is used as an example for the inclined structure 1322. By utilizing the design of inclined structure 1322, the light beams from the first side surface 1128 near the first peripheral substructure 1222 may be guided to improve the uniformity of light distribution. The light beams over condensed near the first side surface 1128 may be prevented and the problem of bright line may be reduced. Please refer to previous embodiment, and various shape designs may be adopted for the cross-sectional shape of the inclined structure 1322 of the instant disclosure. Referring to FIG. 4A to FIG. 4J, for example, a cross-sectional shape of the inclined structure 1322 may be a regular V shape, a half-circular shape, a curved shape, a half-curved shape, a rectangle shape, a trapezoidal shape, a V plus R shape, a half-triangle shape, a half-trapezoidal shape or half-V plus half-R shape, etc., but not limited thereto. In addition to the previous protrude inclined design is adopted for the inclined structure 1322, a recess inclined design or a mixed design of protrude and recess may also be adopted, but not limited thereto.

Please refer to the aforementioned embodiment, and the second reflecting structure 1320 further includes a surface structure 1324 configured on the inclined structure 1322. A stripped half cylinder prism may be adopted for the surface structure 1324. Various designs may also be adopted for the cross-sectional shape of the surface structure 1324 of the instant disclosure. Referring to FIG. 5A to FIG. 5J, for example, a cross-sectional shape of the surface structure 1324 may be a regular V shape, a half-circular shape, a curved shape, a half-curved shape, a rectangle shape, a trapezoidal shape, a V plus R shape, a half-triangle shape, a half-trapezoidal shape or half-V plus half-R shape, etc., but not limited thereto. A design of strip or node may be adopted for the surface structure 1324. By using a node design as an example, a length or a width of the stripped or node like surface structure 1324 may respectively designed with 10 µm-100 µm, but not limited thereto. A The same one of the previous stripped or node like structure, or a mixed arrangement with different previous stripped or node like structure may be adopted for the surface structure 1324. The surface structure 1324 may be arranged in random or in array. A plane design may also be adopted for the surface structure 1324. The space between the strips or the nodes may be increased, and a design flexibility may also be improved. In addition to the previous protrude prism design is adopted for the surface structure 1324, a recess groove or cavity design or a mixed design of protrude and recess may be also adopted, but not limited thereto. In addition, when a prism design is adopted for the first peripheral substructure 1222, an average height of the second reflecting structure 1320 may be larger than an average height of the first reflecting structure 1310.

As shown in FIG. 8B, the light beams projected into the light guide plate 1120 are reflected by the second reflecting structure 1320 at the peripheral girdle region of the light guide plate 1120 and then refracted by the light exit surface 1126, and thus the emitted light beams may have a larger range of angle distribution. For example, the emitted light beams have an inclined angle about 40°-75° with a normal line of the light exit surface 1126, so that the light beams emitted from the light exit surface 1126 corresponding to the first peripheral substructure 1222 have high uniformity. By using the second reflecting structure 1320, the light beams near the first peripheral substructure 1222 may be refracted in a larger angle range and more light scattering are generated. The problem of bright line due to over light condensation near the peripheral girdle region of the light exit surface 1126 can be prevented.

Please refer to FIG. 7, and also refer to FIG. 6. The first peripheral substructure 1222 of the light guide plate 1120 of the instant disclosure has an adjustable width D1. The adjustable width D1 of the first peripheral substructure 1222 may be designed between 0% and 10% of the width of the light guide plate 1120, and the width design may be adjusted according to the product requirement. The adjustable width D1 of the first peripheral substructure 1222 may be equal to or less than 10 mm, such as between 0 mm and mm, but not limited thereto.

Referring to FIG. 7, the light guide plate 1120 further includes a second side surface 1130 in the opposite side, and thus the second side surface 1130 and the first side surface 1128 are disposed in opposite. The second side surface 1130 is located between the light exit surface 1126 and the bottom surface 1124, and the second side surface 1130 connects the light receiving surface 1122, the light exit surface 1126 and the bottom surface 1124, respectively.

The bottom surface 1124 of the light guide plate 1120 further includes a second peripheral substructure 1224 and a second side edge 1234. The second side edge 1234 is located at the connection between the bottom surface 1124 and the second side surface 1130. The second peripheral substructure 1224 is located between the second side edge 1234 and the central region 1210. The central region 1210 has a plurality of first reflecting structures 1310, and the second peripheral substructure 1224 has a plurality of second reflecting structures 1320 different from the first reflecting structures 1310. The second reflecting structure 1320 of the second peripheral substructure 1224 may be referred to the design of the second reflecting structure 1320 of the first peripheral substructure 1222, and it will not be described in detail herein. In a modified embodiment, the locations of the first side surface 1128, the first peripheral substructure 1222 and the first side edge 1232 may be exchanged to the locations of the second side surface 1130, the second peripheral substructure 1224 and the second side edge 1234, but not limited thereto.

Referring to FIG. 7, the second peripheral substructure 1224 of the light guide plate 1120 of the instant disclosure has an adjustable width D2. The adjustable width D2 of the second peripheral substructure 1224 may be designed between 0% and 10% of the width of the light guide plate 1120, and the width design may be adjusted according to the product requirement. The adjustable width D2 of the second peripheral substructure 1224 may be equal to or less than 10 mm, such as between 0 mm and 10 mm, but not limited thereto.

Referring to FIG. 7, the bottom surface 1124 of the light guide plate further includes a third peripheral substructure 1226 and a fourth peripheral substructure 1228. The third peripheral substructure 1226 and the fourth peripheral substructure 1228 are disposed in opposite and separated by the central region 1210, and located between the first peripheral substructure 1222 and the second peripheral substructure 1224. Wherein, the third peripheral substructure 1226 is disposed adjacent to the light receiving surface 1122. The peripheral girdle region 1220 is constructed by the first peripheral substructure 1222, the second peripheral substructure 1224, the third peripheral substructure 1226 and the fourth peripheral substructure 1228. The first peripheral substructure 1222, the second peripheral substructure 1224, the third peripheral substructure 1226 and the fourth peripheral substructure 1228 at least partially surround the central region 1210. Besides, the third peripheral substructure 1226 and the fourth peripheral substructure 1228 have a plurality of second reflecting structures 1320 different from the first reflecting structures 1310. The second reflecting structure 1320 of the third peripheral substructure 1226 and the fourth peripheral substructure 1228 may be referred to the design of the second reflecting structure 1320 of the first peripheral substructure 1222, and it will not be described in detail herein.

Referring to FIG. 7, the third peripheral substructure 1226 and the fourth peripheral substructure 1228 of the light guide plate 1120 of the instant disclosure respectively include an adjustable width D3 and an adjustable width D4. The adjustable width D3 and the adjustable width D4 of the third peripheral substructure 1226 and the fourth peripheral substructure 1228 may be designed between 0% and 10% of the width of the light guide plate 1120, and the width design may be adjusted according to the product requirement. The adjustable width D3 and the adjustable width D4 of the third peripheral substructure 1226 and the fourth peripheral substructure 1228 may be equal to or less than 10 mm, such as between 0 mm and 10 mm, but not limited thereto.

The third peripheral substructure 1226 and the fourth peripheral substructure 1228 may be optionally disposed. In a modified embodiment, for example, only the first peripheral substructure 1222 and the second peripheral substructure 1224 are disposed in the bottom surface 1124, and the third peripheral substructure 1226 and the fourth peripheral substructure 1228 are not disposed. This design still can improve the problem of bright line in the light exit surface 1126 corresponding to the peripheral girdle region 1220, and contribute to enhance the uniformity of light emission of the overall backlight module 1100.

Figure 9:
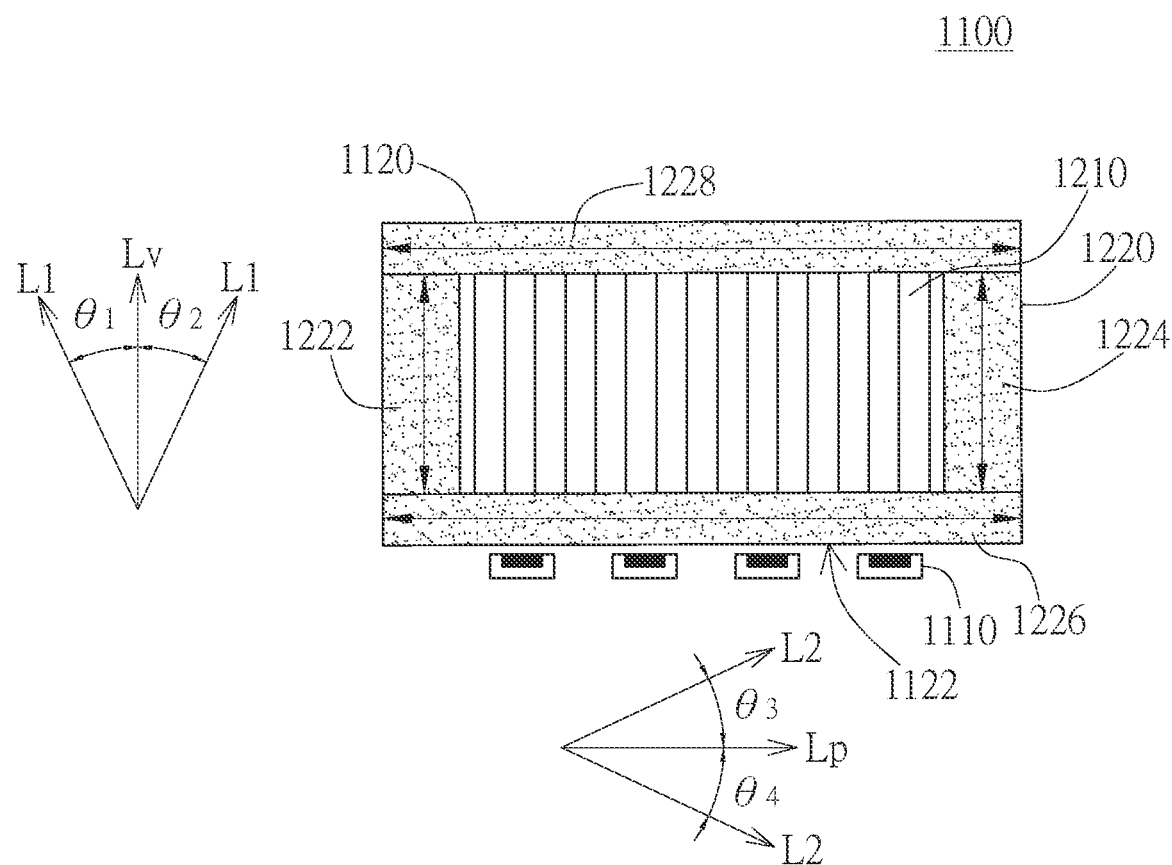
FIG. 9 is a schematic view showing the bottom surface of the backlight module in another embodiment of the instant disclosure, in which extended directions of the peripheral substructures respectively form inclined angles with a vertical direction or a horizontal direction of the light receiving surface.

FIG. 9 is a schematic view showing the bottom surface 1124 of the backlight module 1100 in another embodiment of the instant disclosure. As shown in FIG. 9, the light beams emitted from the light source module 1110 are extended along a light receiving vertical direction Lv of the light receiving surface 1122. The light receiving vertical direction Lv is substantially the same extended direction as the normal direction of the light receiving surface 1122. In other words, the light receiving vertical direction Lv is substantially the same extended direction as the first side edge 1232. In addition, a light receiving horizontal direction Lp of the light receiving surface 1122 is extended substantially in the same extended direction along the second end 1404 of the light receiving surface 1122.

The first peripheral substructure 1222 and the second peripheral substructure 1224 have a first extended direction L1, which is extended in a first side direction from the side edge at the connection of the first peripheral substructure 1222 and the second peripheral substructure 1224. The first extended direction L1 forms an included angle with the light receiving vertical direction Lv. The first extended direction L1 may be deviated to the left to form an included angle θ1 between −30° and 0°, or may be deviated to the right to form an included angle θ2 between 0° and 30°. Therefore, the included angle between the first extended direction L1 and the light receiving vertical direction Lv is between −30° and 30°.

The third peripheral substructure 1226 and the fourth peripheral substructure 1228 have a second extended direction L2, which is extended in a second side direction from the side edge at the connection of the third peripheral substructure 1226 and the fourth peripheral substructure 1228. The second extended direction L2 forms an included angle with the light receiving horizontal direction Lp. The second extended direction L2 may be deviated to the left to form an included angle θ3 between −30° and 0°, or may be deviated to the right to form an included angle θ4 between 0° and 30°. Therefore, the included angle between the second extended direction L2 and the light receiving horizontal direction Lp is between −30° and 30°. Accordingly, an absolute value of the included angle θ1, θ2, θ3 and θ4 is between 0° and 30°.

Figure 10A:
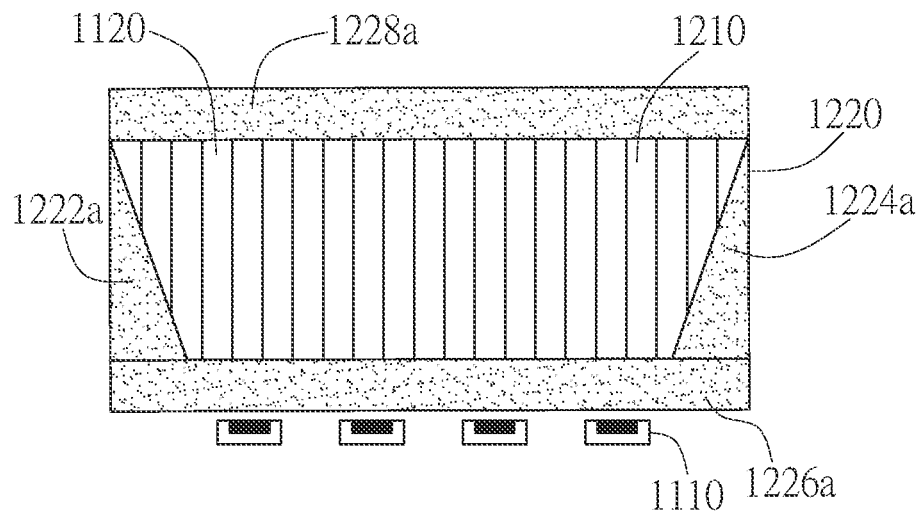
FIGS. 10A-10F are schematic views showing the bottom surface of the light guide plate with the peripheral substructures of various designs in other embodiments of the instant disclosure.

FIGS. 10A-10F are schematic views showing the bottom surface of the light guide plate in other embodiments of the instant disclosure, in which the peripheral substructures are modified in various designs. Referring to FIG. 10A, the first peripheral substructure 1222a may be deviated to the left, such as deviated to the left by −10°, and the second peripheral substructure 1224a may be deviated to the right, such as deviated to the right by 10°, but not limited thereto. The extra part due to the deviation design of the first peripheral substructure 1222a and the second peripheral substructure 1224a may have the same structure of the central region 1210. The detailed structure is described in the aforementioned embodiment and will not be elaborated herein.

Figure 10B:
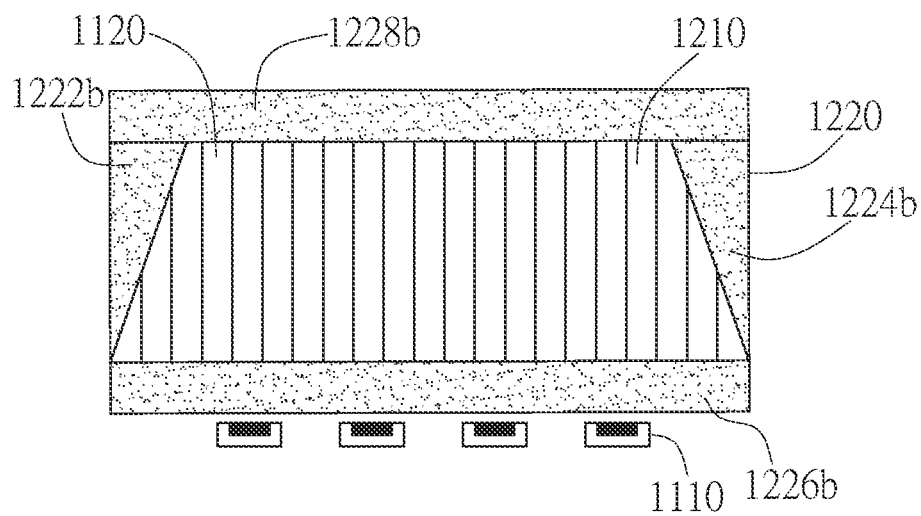

Referring to FIG. 10B, the first peripheral substructure 1222b may be deviated to the right, such as deviated to the right by 10°, and the second peripheral substructure 1224b may be deviated to the left, such as deviated to the left by −10°, but not limited thereto. The extra part due to deviation design of the first peripheral substructure 1222b and the second peripheral substructure 1224b may have the same structure of the central region 1210. The detailed structure is described in the aforementioned embodiment and will not be elaborated herein.

Figure 10C:
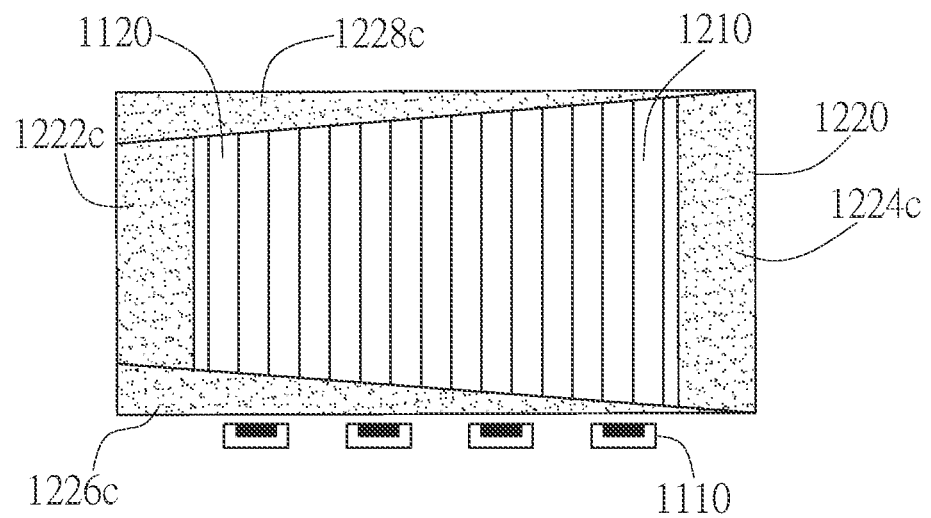

Referring to FIG. 10C, the third peripheral substructure 1226c may be deviated to the right, such as deviated to the right by 10°, and the fourth peripheral substructure 1228c may be deviated to the left, such as deviated to the left by −10°, but not limited thereto. The extra part due to deviation design of the third peripheral substructure 1226c and the fourth peripheral substructure 1228c may have the same structure of the central region 1210. The detailed structure is described in the aforementioned embodiment and will not be elaborated herein.

Figure 10D:
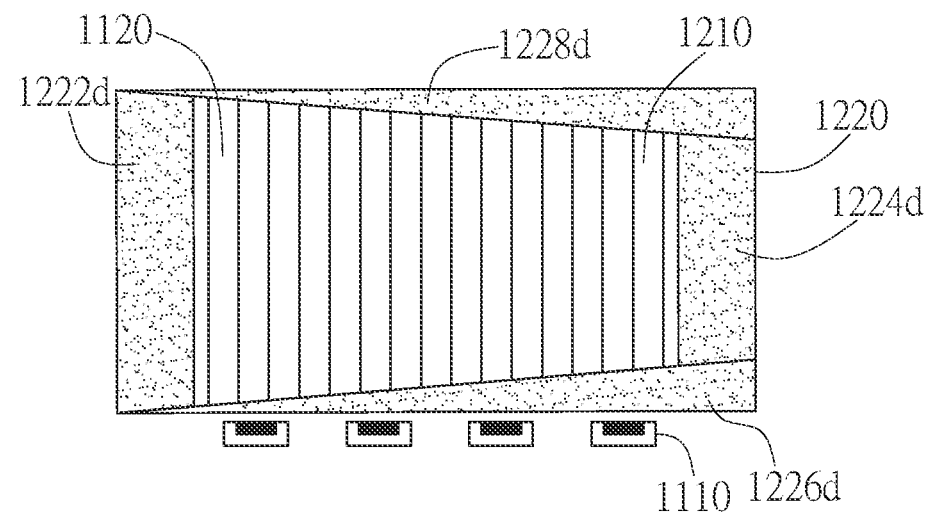

Referring to FIG. 10D, the third peripheral substructure 1226d may be deviated to the left, such as deviated to the left by −10°, and the fourth peripheral substructure 1228d may be deviated to the right, such as deviated to the right by −10°, but not limited thereto. The extra part due to deviation design of the third peripheral substructure 1226d and the fourth peripheral substructure 1228d may have the same structure of the central region 1210. The detail structure is described in the aforementioned embodiment and will not be elaborated herein.

Figure 10E:
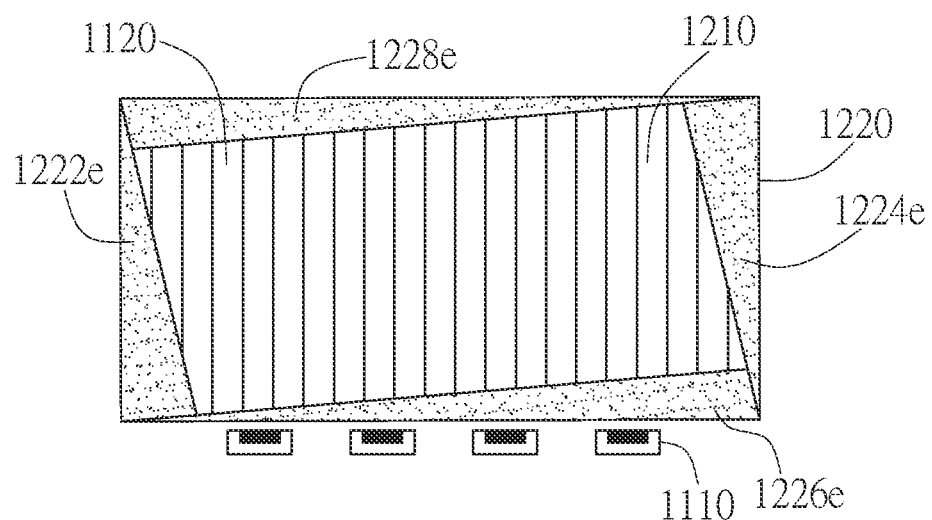

Referring to FIG. 10E, the first peripheral substructure 1222e may be deviated to the left, such as deviated to the left by −10°, and the second peripheral substructure 1224e may be deviated to the left, such as deviated to the left by −10°. The third peripheral substructure 1226e may be deviated to the left, such as deviated to the left by −10°, and the fourth peripheral substructure 1228e may be deviated to the left, such as deviated to the left by −10°, but not limited thereto. The extra parts due to deviation design of the first peripheral substructure 1222e, the second peripheral substructure 1224e, the third peripheral substructure 1226e and the fourth peripheral substructure 1228e may have the same structure of the central region 1210. The detail structure is described in the aforementioned embodiment and will not be elaborated herein.

Figure 10F:
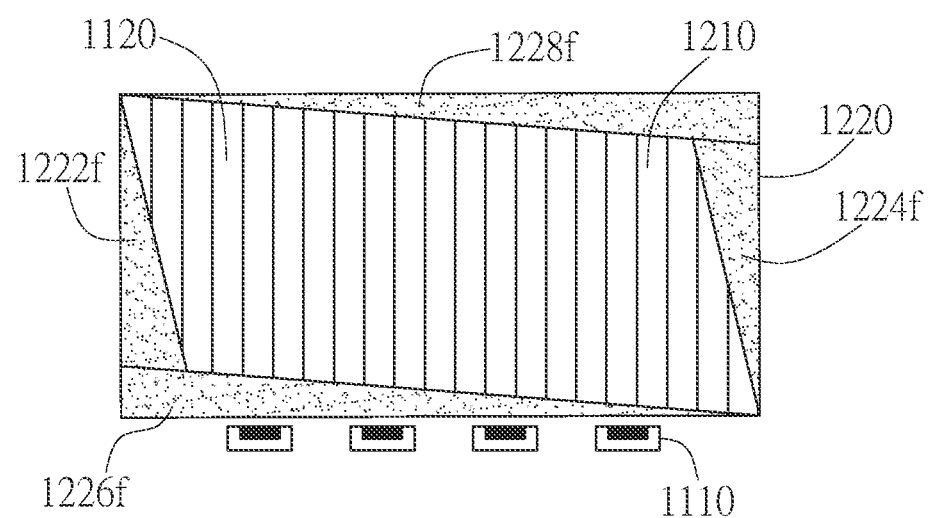

Referring to FIG. 10F, the first peripheral substructure 1222f may be deviated to the left, such as deviated to the left by −10°, and the second peripheral substructure 1224f may be deviated to the left, such as deviated to the left by −10°. The third peripheral substructure 1226f may be deviated to the right, such as deviated to the right by −10°, and the fourth peripheral substructure 1228f may be deviated to the right, such as deviated to the right by −10°, but not limited thereto. The extra parts due to deviation design of the first peripheral substructure 1222f, the second peripheral substructure 1224f, the third peripheral substructure 1226f and the fourth peripheral substructure 1228f may have the same structure of the central region 1210. The detail structure is described in the aforementioned embodiment and will not be elaborated herein.

The light guide plate of the instant disclosure includes the peripheral girdle region or the first peripheral substructure in the bottom surface. By utilizing the different design of the peripheral girdle region (or the first peripheral substructure) and the central region, the light beams in the neighborhood of the peripheral girdle region may be uniformly reflected to the light exit surface, so that the problem of over concentration of reflected light at the peripheral girdle region of the bottom surface can be mitigated. Therefore, the problems of bright line or spray light relatively on the light exit surface corresponding to the peripheral girdle region may be resolved, improving the luminous uniformity of the light exit surface of the light guide plate and the overall display quality.

Although the preferred embodiments of the instant disclosure have been described herein, the above description is merely illustrative. The preferred embodiments disclosed will not limit the scope of the instant disclosure. Further modification of the instant disclosure herein disclosed will occur to those skilled in the respective arts and all such modifications are deemed to be within the scope of the instant disclosure as defined by the appended claims.

What is claimed is:

1. A light guide plate, comprising:
    a light receiving surface;
    a light exit surface connected to a first end of the light receiving surface; and
    a bottom surface connected to a second end of the light receiving surface opposite to the first end and located opposite to the light exit surface; and a first side surface located between the light exit surface and the bottom surface and connected to the light receiving surface, the light exit surface and the bottom surface, wherein the bottom surface has a central region, a first side edge and a peripheral girdle region, the central region is located at a center of the bottom surface, the first side edge is located at a location where the bottom surface and the first side surface are connected, the peripheral girdle region is located between the first side edge and the central region and surrounds the central region, the peripheral girdle region has a first peripheral substructure, the central region has a plurality of first reflecting structures, and the first peripheral substructure has a plurality of second reflecting structures different from the first reflecting structures.

2. The light guide plate of claim 1, wherein the second reflecting structures have an extended direction along an adjacent side edge of the bottom surface.

3. The light guide plate of claim 2, wherein a length of the second reflecting structure is larger than a length of the first reflecting structure in the extended direction along the adjacent side edge of the bottom surface.

4. The light guide plate of claim 1, wherein the second reflecting structure has a light dispersion efficiency larger than that of the first reflecting structure in an extended direction vertical to an adjacent side edge of the bottom surface.

5. The light guide plate of claim 1, wherein the second reflecting structure includes an inclined structure, and a cross-sectional shape of the inclined structure includes at least one of a regular V shape, a shallow curved shape, a curved shape, a half-curved shape, a rectangle shape, a trapezoidal shape, a V plus R shape, a half-triangle shape, a half-trapezoidal shape or a half-V plus half-R shape.

6. The light guide plate of claim 1, wherein the second reflecting structure further includes a surface structure, and a cross-sectional shape of the surface structure includes at least one of a regular V shape, a shallow curved shape, a curved shape, a half-curved shape, a rectangle shape, a trapezoidal shape, a V plus R shape, a half-triangle shape, a half-trapezoidal shape or a half-V plus half-R shape.

7. The light guide plate of claim 1, wherein the peripheral girdle region has a width equal to or less than 10 mm.

8. The light guide plate of claim 1, wherein the peripheral girdle region has the first peripheral substructure and a second peripheral substructure disposed in opposite and separated by the central region, and the first peripheral substructure and the second peripheral substructure respectively have a first extended direction including an angle between −30° and 30° with a light receiving vertical direction of the light receiving surface.

9. The light guide plate of claim 8, wherein the first peripheral substructure includes a prism having an average height larger than an average height of the first reflecting structures.

10. The light guide plate of claim 8, wherein the peripheral girdle region further includes a third peripheral substructure and a fourth peripheral substructure disposed in opposite and separated by the central region, the third peripheral substructure and the fourth peripheral substructure respectively connect the first peripheral substructure and the second peripheral substructure, and the third peripheral substructure and the fourth peripheral substructure have a second extended direction including an angle between −30° and 30° with a light receiving horizontal direction of the light receiving surface.

11. A backlight module, comprising:
   the light guide plate as claimed in claim 1; and
   a light source module distributed along the light receiving surface and configured to provide light beams incident into the light receiving surface.

* * * * *